(12) United States Patent
Hosaka et al.

(10) Patent No.: US 7,356,191 B2
(45) Date of Patent: Apr. 8, 2008

(54) IMAGE ENCODING APPARATUS AND METHOD, PROGRAM AND RECORDING MEDIUM

(75) Inventors: Kazuhisa Hosaka, Tokyo (JP); Takahiro Fukuhara, Kanagawa (JP)

(73) Assignee: Sony Corporation, Tokyo (JP)

( * ) Notice: Subject to any disclaimer, the term of this patent is extended or adjusted under 35 U.S.C. 154(b) by 805 days.

(21) Appl. No.: 10/724,102

(22) Filed: Dec. 1, 2003

(65) Prior Publication Data

US 2004/0161155 A1    Aug. 19, 2004

(30) Foreign Application Priority Data

Dec. 2, 2002    (JP)    ............... 2002-350185

(51) Int. Cl.
*G06K 9/36*    (2006.01)
(52) U.S. Cl. .................. 382/248; 382/232; 382/239; 375/240.2; 375/240.02
(58) Field of Classification Search .............. None
See application file for complete search history.

(56) References Cited

U.S. PATENT DOCUMENTS

| | | | |
|---|---|---|---|
| 5,926,222 A * | 7/1999 | Nickerson | 375/240.04 |
| 6,356,665 B1 * | 3/2002 | Lei et al. | 382/240 |
| 6,876,700 B2 * | 4/2005 | Sugahara | 375/240.01 |
| 2004/0252893 A1 * | 12/2004 | Togashi | 382/232 |

FOREIGN PATENT DOCUMENTS

| | | |
|---|---|---|
| JP | 11-225335 | 8/1999 |
| JP | 2002-165098 | 6/2002 |
| JP | 2003-032680 | 1/2003 |
| JP | 2004-064104 | 2/2004 |

OTHER PUBLICATIONS

U.S. Appl. No. 10/691,650, filed Oct. 24, 2003, Fukuhara et al.
U.S. Appl. No. 10/724,102, filed Dec. 1, 2003, Hosaka et al.
U.S. Appl. No. 10/724,102, filed Dec. 1, 2003, Hosaka et al.
U.S. Appl. No. 10/933,274, filed Sep. 3, 2004, Fukuhara et al.

* cited by examiner

*Primary Examiner*—Jingge Wu
*Assistant Examiner*—Sean Motsinger
(74) *Attorney, Agent, or Firm*—Oblon, Spivak, McClelland, Maier & Neustadt, P.C.

(57) ABSTRACT

In an image encoder is provided, including a to-be-encoded object prediction unit which counts quantization coefficients which are newly made significant, for example, when each bit plane is encoded, on the basis of quantization coefficient for each bit plane in all code blocks to provide a feature amount, estimates the number of generated codes on the basis of the feature amount, and adds the estimated number of codes in a predetermined order. When an initial target number of codes is reached, the to-be-encoded object prediction unit stops the addition, and supplies the entropy encoder with information on the bit planes having the quantization coefficients thereof been added as to-be-encoded object information. In this entropy encoder, only the quantization coefficient in the bit planes represented by the to-be-encoded object information, is processed by three types of encoding passes while truncating the quantization coefficients of the other bit planes.

14 Claims, 13 Drawing Sheets

IMAGE ENCODING APPARATUS AND METHOD, PROGRAM AND RECORDING MEDIUM

BACKGROUND OF THE INVENTION

1. Field of the Invention

The present invention relates to an image encoding apparatus and method, for compressing an image by wavelet transformation and entropy coding as in JPEG-2000, a program allowing a computer to make the image coding, and a recording medium having the program recorded therein.

This application claims the priority of the Japanese Patent Application No. 2002-350185 filed on Dec. 2, 2002, the entirety of which is incorporated by reference herein.

2. Description of the Related Art

Images can be stored in compressed form by the Joint Photographic Experts Group (JPEG) technique standardized by the International Standards Organization (ISO), a typical one of the conventional image compression techniques. The JPEG uses a discrete cosine transform (DCT). Considering the allocation of relatively many bits, the JPEG method is known for providing good encoded and decoded images. However, the number of encoded bits, smaller than a certain extent, will result in a remarkable block distortion peculiar to DCT and a noticeable subjective deterioration.

On the other hand, there have recently been made active studies of image compression techniques by which an image is divided into a plurality of bands by a so-called filter bank formed from a high-pass filter and low-pass filter in combination and each of the bands is encoded. Of these image compression techniques, the coding by the wavelet transformation is most likely to be a new technique that takes the place of DCT, as it does not have the disadvantage of remarkable block distortion caused by high compression.

The above-mentioned JPEG-2000 established as an international standard in January, 2001 adopts a combination of the wavelet transformation and a high-efficiency entropy coding (bit modeling and algebraic coding in units of a bit plane) and attains a considerably improved efficiency of coding as compared with JPEG.

The above international standards define only the requirements regarding the decoder and the encoder can freely be designed. On the other hand, since they include no standard for an effective rate controlling technique to attain a target rate of compression, it is the most important thing to establish a know-how of the bit rate control. Especially with the JPEG technique, it is difficult to control the rate and also it is necessary to encode data a plurality of times until a target rate is attained, which leads to an increased time of data processing. Therefore, the JPEG-2000 technique should desirably be able to generate a target number of codes by one try of coding.

On this account, the Inventors of the present invention proposed a technique of controlling the rate by truncating the tail end of a code stream once generated, as disclosed in the Japanese Patent Application Laid-Open No. 2002-165098. With this technique, it is capable to control the rate precisely according to a target number of codes.

Note, however, that the entropy coding is generally a large load to the encoder defined in the JPEG-2000. On the other hand, codes generated by encoding data at a target compression rate or bit rate include some ones that are not actually usable and they will eventually be inutile.

Since the above rate control is done in the downstream of an entropy encoder, however, it is not possible to confirm in the entropy coding that the rate control is made of a final code stream and thus all the data have to be encoded.

OBJECT AND SUMMARY OF THE INVENTION

It is therefore an object of the present invention to overcome the above-mentioned drawbacks of the related art by providing an image encoder defined in the JPEG-2000, for example, and capable of an entropy coding with a reduced load of data processing, an image encoding method adopted in the image encoder, a program allowing a computer to execute the image coding, and a computer-readable recording medium having the image encoding program recorded therein.

The above object can be attained by providing an image encoding apparatus and method, in which an input image is filtered to generate subbands, the subbands thus filtered are divided into code blocks of a predetermined size, and a bit plane ranging from the most significant bit (MSB) to least significant bit (LSB) is generated for each of the code blocks. Then, the number of codes in each bit plane is estimated, a bit plane to be encoded is predicted based on the estimated number of codes, each of the to-be-encoded bit planes is subjected to bit modeling to generate an encoding pass for each bit plane, algebraic coding is done within the encoding pass, and a stream of codes is generated using the algebraic code thus generated.

Also the above object can be attained by providing an image encoding apparatus and method, in which an input image is filtered to generate subbands, the subbands thus filtered are divided into code blocks of a predetermined size, and a bit plane ranging from the most significant bit (MSB) to least significant bit (LSB) is generated for each of the code blocks. Also, the number of codes in each encoding pass is estimated, and a to-be-encoded pass is predicted on the basis of the estimated number of codes. Then each of the bit planes is subjected to bit modeling to generate an encoding pass for each bit plane, data within one to be encoded of the encoding passes is algebraically encoded, and a stream of codes is generated using the algebraic code thus generated.

In the above image encoding method and apparatus, the number of codes in each bit plane or encoding pass is estimated before the algebraic coding, and a bit plane or encoding pass to be encoded is predicted based on the estimated number of codes, and only the bit plane or encoding pass to be encoded is algebraically encoded.

Also, the above object can be attained by providing a program which allows a computer to execute the above-mentioned image encoding, and a computer-readable recording medium having the program recorded therein.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 2 explains subbands resulted from a wavelet transformation and division to a division level 3;

FIGS. 4A to 4C explain a bit plane, in which FIG. 4A shows a quantum coefficient consisting of a total of 16 coefficients, FIG. 4B shows a bit plane of the coefficient absolute-values, and FIG. 4C shows a code bit plane;

FIGS. 9A and 9B explain IDs of code blocks in the image encoder, in which FIG. 9A shows an example in which an HL subband is given priority over an LH subband and FIG. 9B shows an example in which the LH subband is given priority over the HL subband;

DETAILED DESCRIPTION OF THE PREFERRED EMBODIMENTS

The present invention will be described in detail concerning the embodiments thereof with reference to the accompanying drawings. The embodiments are applications of the present invention to an image encoding apparatus and method, in which an input image is compressed by encoding with the JPEG-2000 technique. In the following, there will be described first the overall construction and operations of the image encoder, and then the substantial parts of the image encoder, to which the present invention is applied.

(1) Construction and Function of the Image Encoder

Figure 1:
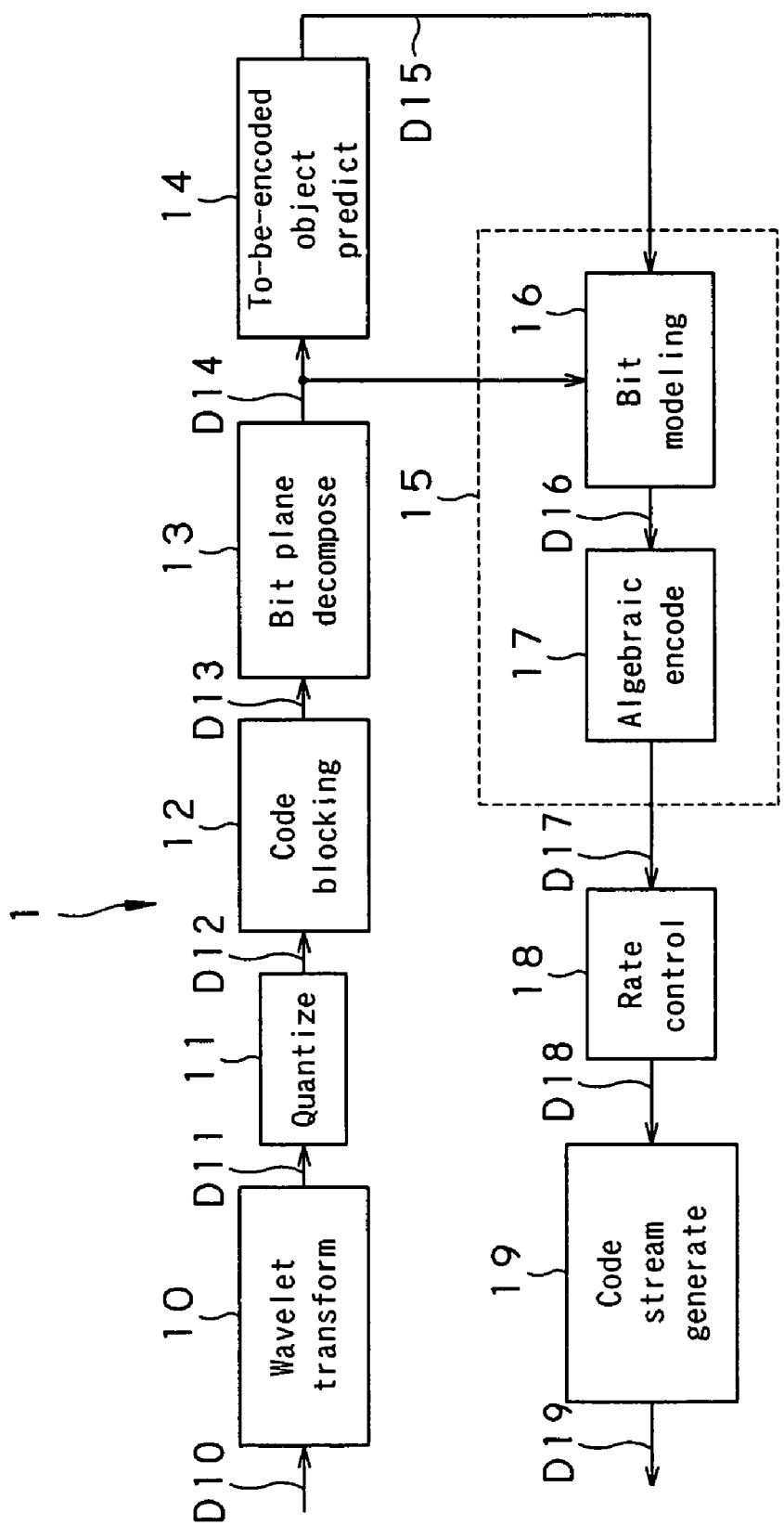
FIG. 1 is a schematic block diagram of the image encoder according to the present invention.

Referring now to FIG. 1, there is schematically illustrated in the form of a block diagram the image encoder according to the present invention. As shown, the image encoder, generally indicated with a reference number 1, includes a wavelet transformer 10, quantizer 11, code blocking unit 12, bit plane decomposer 13, to-be-encoded object prediction unit 14, entropy encoder 15, rate controller 18 and a code stream generator 19. It should be noted that the entropy encoder 15 includes a bit modeling block 16 and algebraic encoder 17.

The wavelet transformer 10 is normally formed from a filter bank consisting of low- and high-pass filters. It should be noted that since the digital filter normally provides an impulse response (filter factor) of multiple tap lengths, it is necessary to pre-buffer sufficient number of input images to be filtered, which is not shown in FIG. 1 for the simplicity of illustration and explanation.

Supplied with minimum necessary image signals D10 for filtering, the wavelet transformer 10 divides the image signals D10 into subbands by filtering the image signals D10 for the wavelet transformation, and thus generates a wavelet transformation coefficient D11 for each subband.

Figure 2:
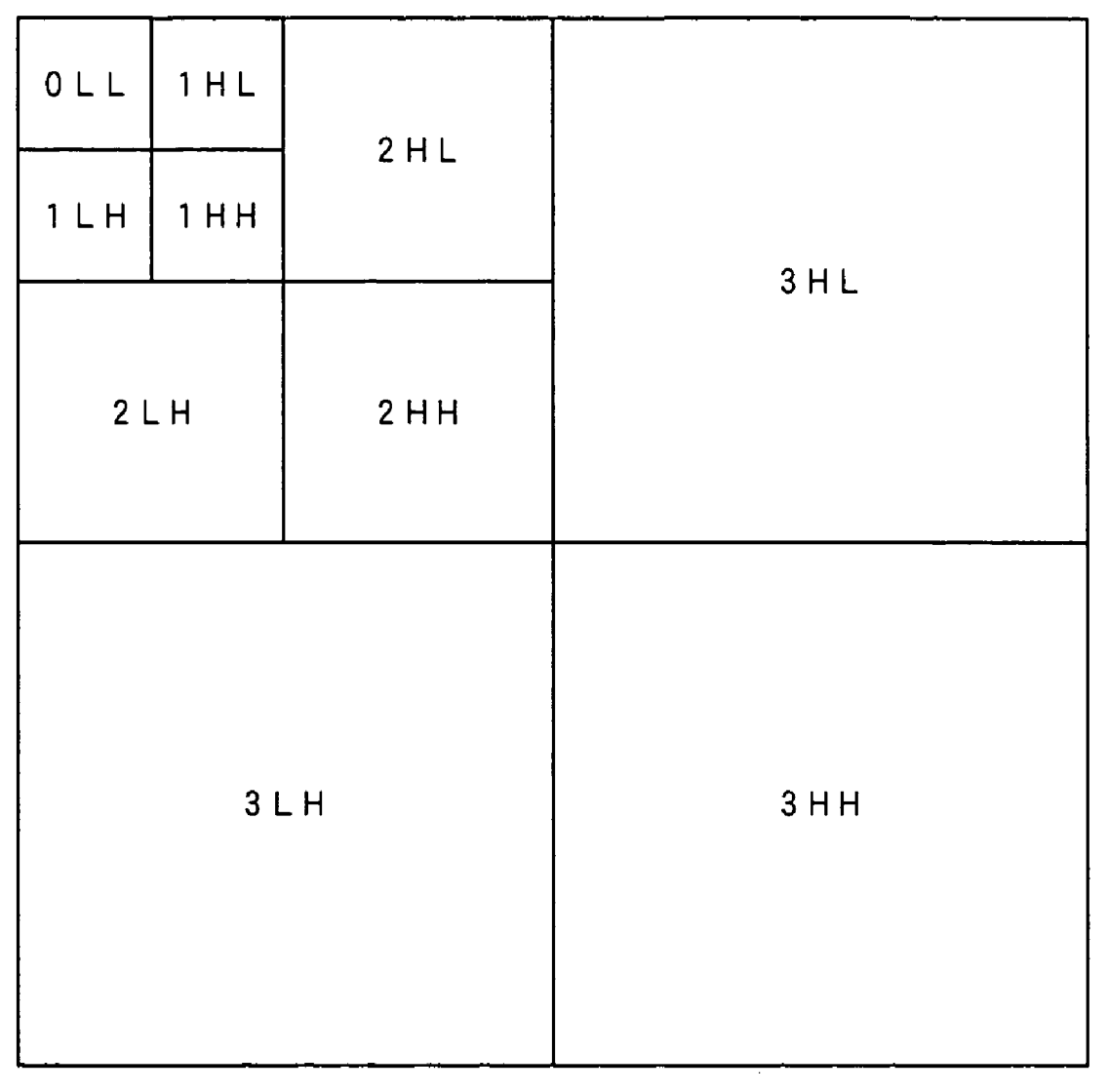

Normally in the wavelet transformation, the subbands in a lowest frequency band are recursively transformed as shown in FIG. 2 for the image energies are concentrated in the low-frequency components. As shown in FIG. 2, the wavelet transformation level is 3. Namely, a total of 10 subbands is resulted from the wavelet transformation. It should be noted that in FIG. 2, "L" and "H" indicate a low-frequency band and high-frequency band, respectively, and a number before each of "L" and "H" indicates a division level. For example, "1LH" indicates a subband being horizontally low in frequency and vertically high in frequency and which is of a division level 1.

The quantizer 11 quantizes a wavelet transformation coefficient D11 of each of the subbands supplied from the wavelet transformer 10 to make irreversible compression of the wavelet transformation coefficient D11, to thereby generate a quantization coefficient D12. For this quantization, there may be used a scalar quantization in which the wavelet transformation coefficient D11 is divided by a quantization-step size.

Figure 3:
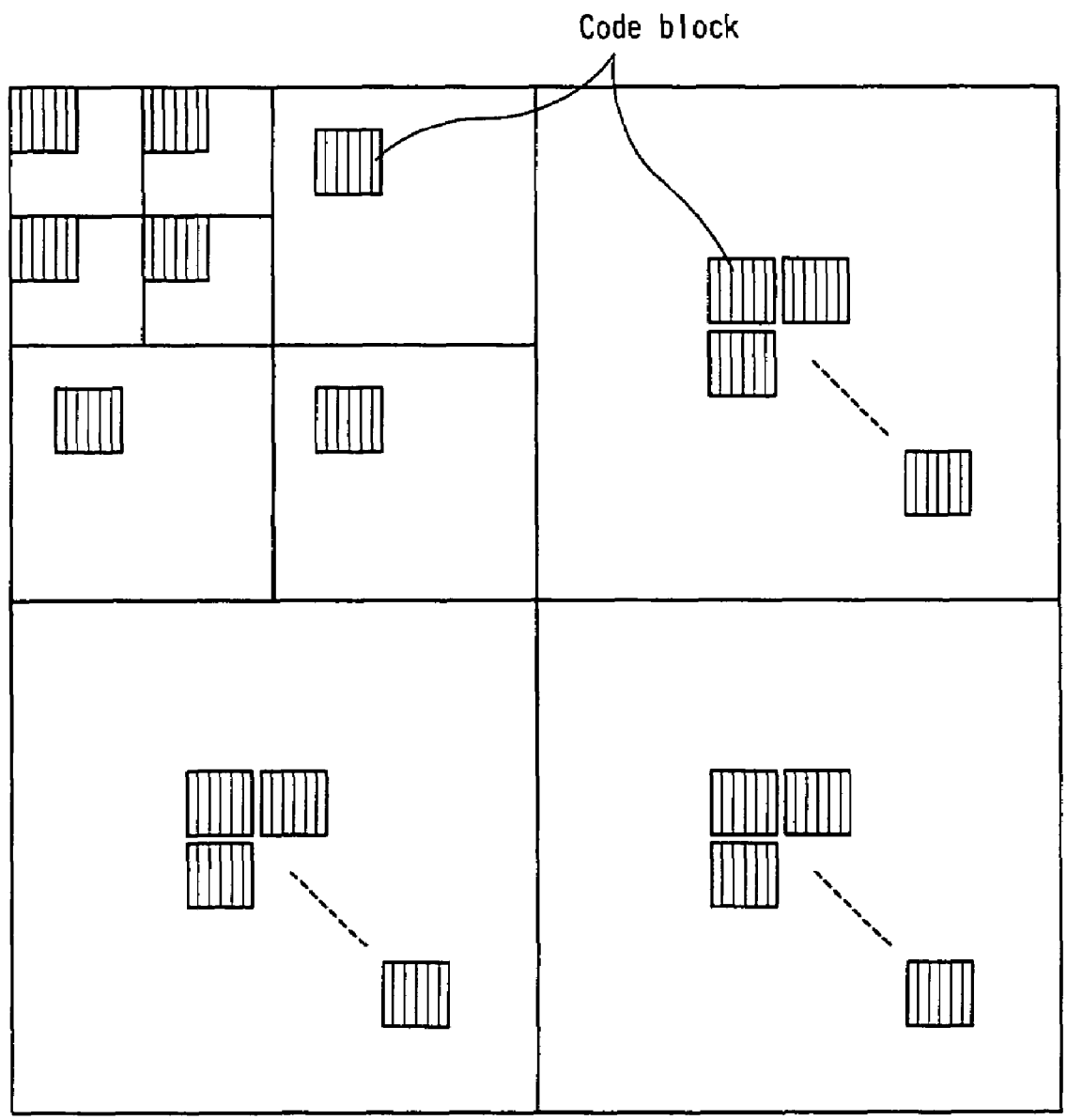
FIG. 3 shows the relation between code blocks and subbands.

The code blocking unit 12 divides the quantization coefficient D12 generated by the quantizer 11 into codes blocks of a predetermined size that is a unit of entropy coding. FIG. 3 shows the positional relation between the code blocks in the subband. Normally, code blocks of sizes on the order of 64×64, 32×32 and 128×32, for example, are generated in all the subbands after divided as above. Therefore, in case the size of a subband whose division level is smallest in FIG. 2, namely, 3HH, is 640×320, the subband will include a total of 50 code blocks (10 in horizontal direction by 5 in vertical direction) of 64×64 in size. The code blocking unit 12 supplies a quantization coefficient D13 of each code block to the bit plane decomposer 13. Each of these code blocks is encoded subsequently.

Figure 4:
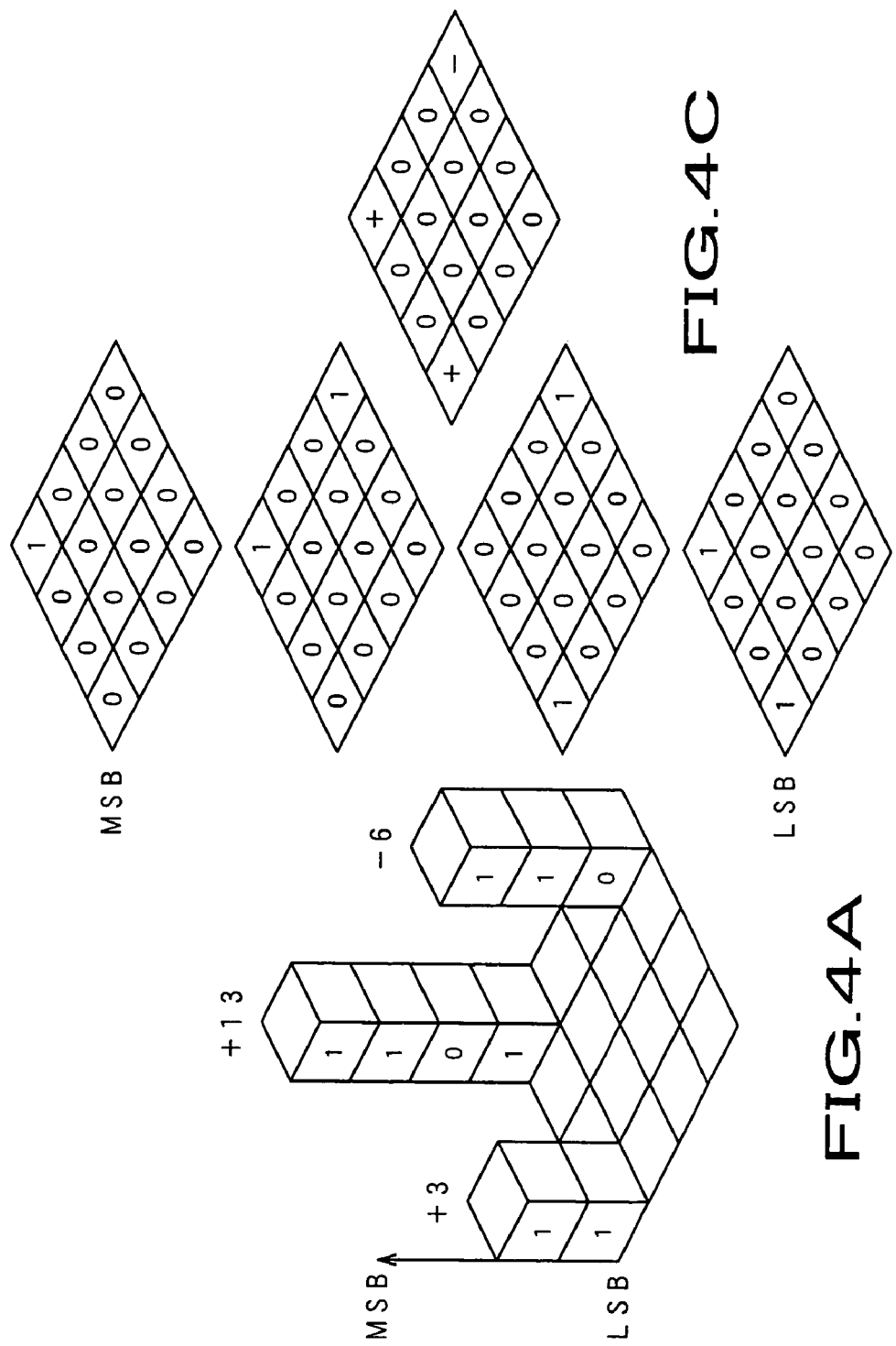

The bit plane decomposer 13 decomposes the quantization coefficient D13 of each code block into bit planes of which the concept is shown in FIGS. 4A to 4C. FIG. 4A shows a concept of the bit plane consisting of a total of 16 quantization coefficients (4 in vertical direction by 4 in horizontal direction). Of these 16 coefficients, the largest one has an absolute value of 13 and it is binary-notated as "1101". Therefore, the bit plane defined by bit plane absolute-values includes 4 bit planes as shown in FIG. 4B. It should be noted that each of bit plane elements takes a number "0" or "1". On the other hand, only "–6" of the quantization coefficients takes a negative value while the other quantization coefficients take "0" or a positive value. Therefore, signs define a bit plane as shown in FIG. 4C. The bit plane decomposer 13 supplies a quantization coefficient D14 decomposed in bit planes to the to-be-encoded object prediction unit 14 and the bit modeling unit 16 of the entropy encoder 15.

The to be-encoded object prediction unit 14 predicts an eventually to-be-encoded bit plane before being encoded by the entropy encoder 15 on the basis of the quantization coefficient D14 decomposed in bit planes by the bit plane decomposer 13, and supplies it as to be-encoded information D15 to the bit modeling block 16 in the entropy encoder 15. It should be noted that the operations made for the prediction in the to be-encoded object prediction unit 14 will be described in detail later.

The bit modeling block 16 makes coefficient bit modeling of the quantization coefficient D14 of a bit plane represented by the to be-encoded information D15 supplied from the to be-encoded object prediction unit 14, which quantization coefficient D14 being included in the quantization coefficients D14 of the bit planes supplied from the bit plane decomposer 13, as will be described below, and supplies an encoding symbol and context D16 to the algebraic encoder 17. The algebraic encoder 17 makes algebraic coding of the encoding symbol on the basis of the supplied context to generate an algebraic code D17, and supplies the code D17 to the rate controller 18. This embodiment of the present invention will be explained taking the entropy coding called "EBCOT" defined especially in the JPEG-2000 for example. The "EBCOT" is described in detail in the document "ISO/IEC 15444-1, Information Technology—JPEG 2000, Part 1: Core Coding System" and the like, for example. It should be noted that as mentioned above, the entropy encoder 15 is composed of the bit modeling block 16 and algebraic encoder 17.

Figure 5:
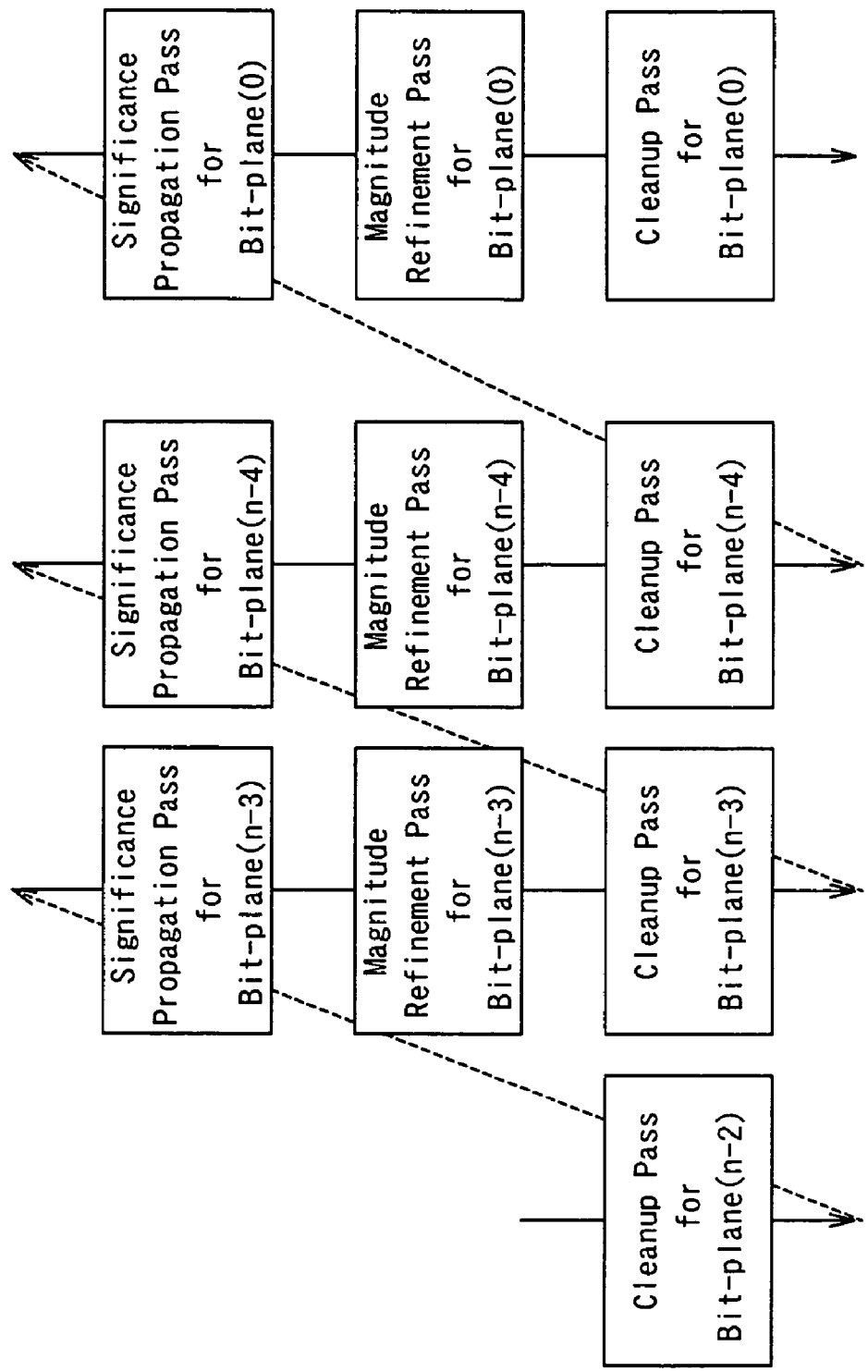
FIG. 5 explains a procedure for processing encoding passes in the code block.

The "EBCOT" is a means for encoding coefficient bits in each block of a predetermined size while measuring the statistics of the coefficient bits. It makes entropy coding of the quantization coefficient in each code block. The code block is encoded independently for each bit plane in a direction from the most significant bit (MSB) toward the least significant bit (LSB). Also, the matrix size of the code block is a power of 2 ranging from 4 to 256, normally, it is 32×32, 64×64, 128×32 or the like. The quantization coefficient is represented by a signed n-bit binary number and bits 0 to (n−2) express LSB to MSB, respectively. It should be noted that the remaining one bit is a sign. The code block is encoded starting with the bit plane at MSB by three types of encoding passes as will be explained in the following items (a) to (c):

(a) Significance Propagation Pass
(b) Magnitude Refinement Pass
(c) Cleanup Pass FIG. 5 shows a sequence in which the three encoding passes are used. As shown in FIG. 5, a bit plane (n−2) (MSB) is first encoded by "Cleanup Pass (will be referred to as "CU Pass" hereinafter wherever appropriate)", next the bit planes are encoded sequentially toward LSB by "Significance Propagation Pass (will be referred to as "SP Pass" hereinafter wherever appropriate)", then by "Magnitude Refinement Pass (will be referred to as "MR Pass" hereinafter wherever appropriate)", and by "CU Pass" again. This cycle is repeated.

Actually, however, it is stated in the header in which bit plane counted from MSB "1" will first appear but any bit plane consisting of no coefficients (zero-bit plane) is not encoded. A trade-off can be made between the number of codes and image quality, that is, a compression rate can be controlled, by encoding the bit planes in the above sequence by the three types of encoding passes, aborting the coding when an arbitrary bit plane has been encoded by an arbitrary encoding pass.

Figure 6:
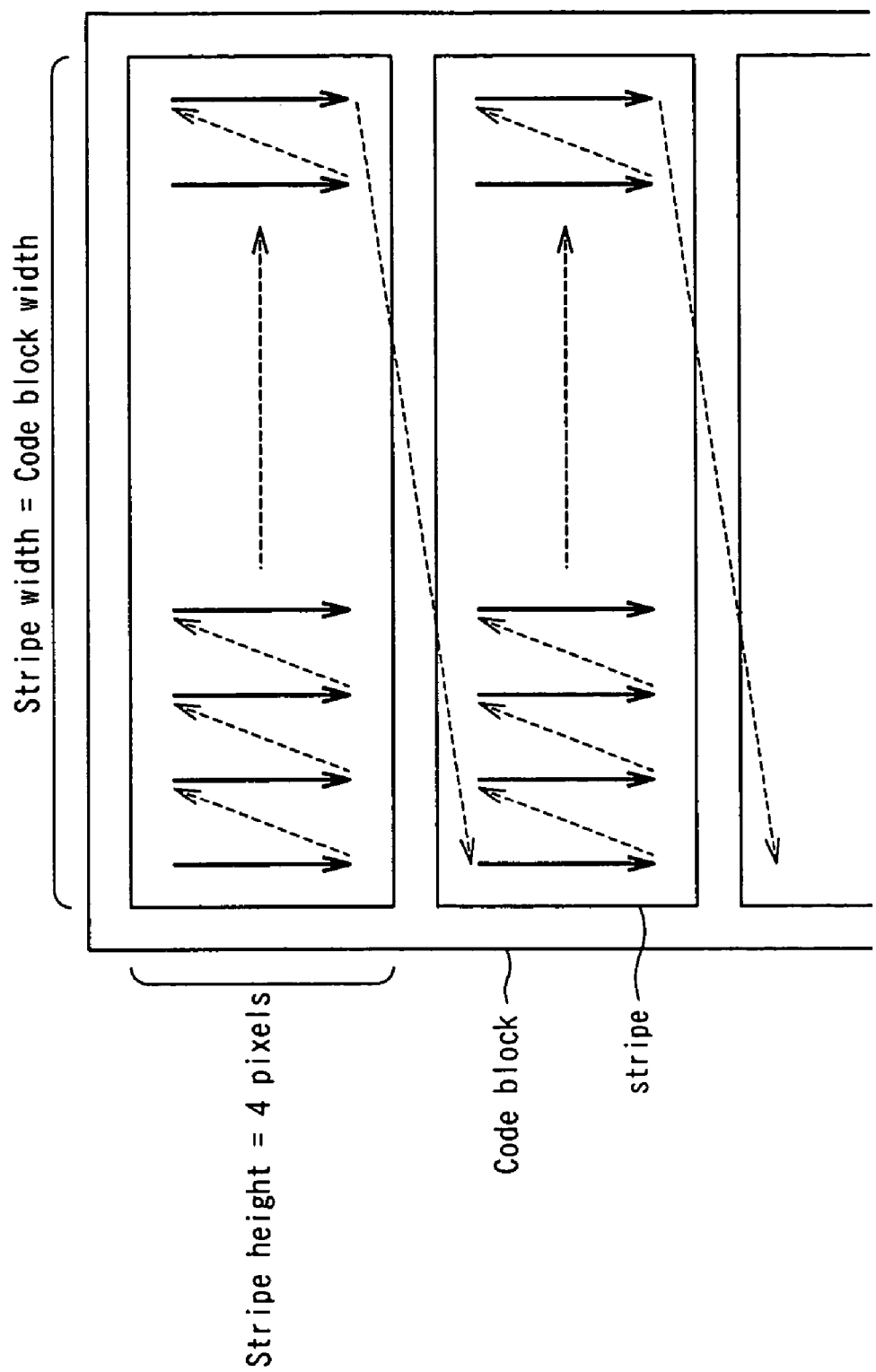
FIG. 6 explains a sequence of scanning the coefficients in the code block.

The scanning of coefficient bits will be explained here with reference to FIG. 6. A code block consists of stripes each having a height of 4 coefficient bits. The width of each stripe is equal to that of the code block. The scanning sequence is a sequence in which all coefficient bits in one code block are scanned. The coefficient bits are scanned from an upper stripe to a lower stripe in a code block, from a left column to right column in each stripe, and from top to bottom in each column. It should be noted that in each encoding pass, all coefficient bits in one code block are scanned as above.

The above three encoding passes will be explained below. It should be noted that all these encoding passes are described in the document "ISO/IEC 15444-1, Information Technology—JPEG 2000, Part 1: Core Coding System".

(a) Significance Propagation Pass (SP Pass)

In the SP Pass for encoding a bit plane, there are algebraically encoded non-significant coefficient bits in which at least one coefficient near "8" is significant. When the encoded coefficient bit takes a value "1", it is continuously encoded algebraically whether a sign is positive or negative.

Note that the "significance" is a state the encoder has for each coefficient bit. The initial value of the "significance" is "0" which indicates that the coefficient bit is "non-significant". When "1" is encoded with the coefficient, the value changes to "1" which indicates that the coefficient bit "significant" and will always be "1" subsequently. Therefore, the "significance" may be said to be a flag indicating whether information at valid digits have already been encoded. If an SP Pass takes place in a bit plane, no SP Pass will take place in any subsequent bit planes.

(b) Magnitude Refinement Pass (MR Pass)

In the MR pass for a bit plane, significant coefficient bits not encoded in the SP Pass for a bit plane are algebraically encoded.

(c) Cleanup Pass (CU Pass)

In the CU Pass for a bit plane, non-significant bits not encoded in the SP Pass for a bit plane are algebraically encoded. When the coefficient bit thus encoded takes a value "1", it is continuously encoded algebraically whether a sign is positive or negative.

Note that for algebraic coding in the above three encoding passes, ZC (zero coding), RLC (run-length coding), SC (signal coding) and MR (magnitude refinement) are selectively used to select a coefficient context. Then, the context thus selected is encoded by an algebraic coding called "MQ coding". The "MQ coding" is a learning-type binary algebraic coding defined in JBIG2. The "MQ coding" is described in the document "ISO/IEC FDIS 14492, "Lossy/Lossless Coding of Bi-Level Images", March 2000", for example. The JPEG-2000 covers a total of 19 kinds of contexts for all the encoding passes.

The bit modeling block 16 generates an encoding symbol and context D16 by processing, by the three encoding passes, one of the quantization coefficients D14 for each bit plane, that is indicated with the to be-encoded object information D15 supplied from the to be-encoded object prediction unit 14 as above. The algebraic encoder 17 generates an algebraic code D17 by making algebraic coding of the encoding symbol on the basis of the context D16.

After processing the quantization coefficients D14 by at least a part of the encoding passes, the rate controller 18 counts the algebraic codes D17 supplied from the algebraic encoder 17. When the rate controller 18 has counted a target number of codes D17, it will truncate subsequent codes D17. By truncating the quantization coefficients just before they exceed the target number of codes, it is possible to positively keep the target number of codes. The rate controller 18 supplies an algebraic code D18 resulted from the control of the number of codes to the code stream generator 19. It should be noted the rate control by the rate controller 18 will be described in detail later.

Figure 7:
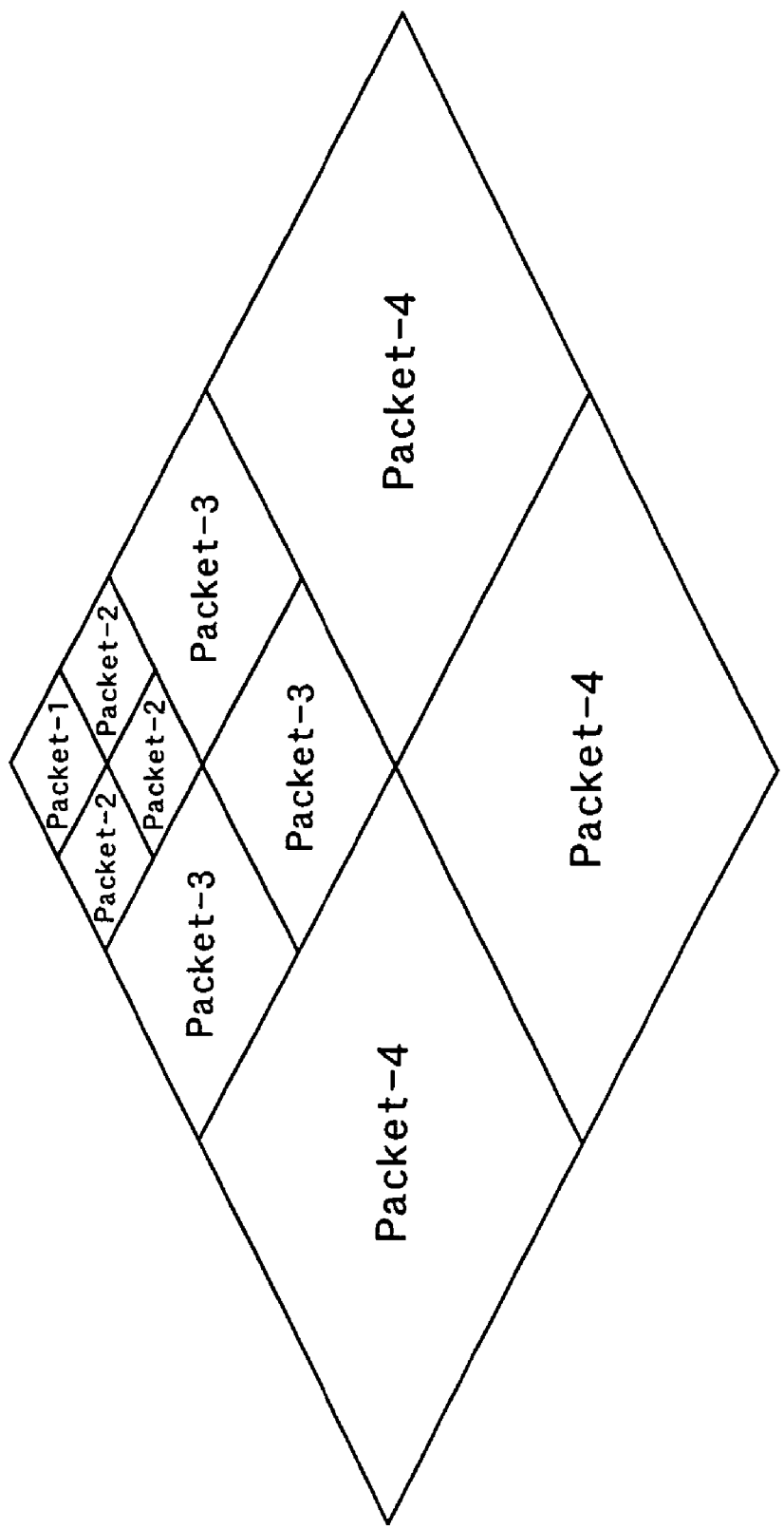
FIG. 7 explains packets generated in a code stream generator included in the image encoder.

The code stream generator 19 generates, as a header, additional information in the code block, such as the number of encoding passes and compressed code stream data length in the code block on the basis of the algebraic code D18 resulted from the control of the number of codes, supplied from the rate controller 18. Then the code stream generator 19 generates a packet by combining together the header and the algebraic code D18 resulted from the control of the number of codes and outputs the packet as a code stream D19. At this time, the code stream generator 19 generates individual packets at each of the resolution levels as shown in FIG. 7. As shown in FIG. 7, a packet-1 in the lowest band includes only LL component, and other packets-2 to -4 include LH, HL and HH components.

As above, the image encoder 1 as the embodiment of the present invention can effectively compress image signal D10 by the wavelet transformation and entropy coding into packets, and output the packets as the code stream D19.

(2) Substantial Parts of the Image Encoder to Which the Present Invention is Applied (2-1) Construction and Function of the to-be-Encoded Object Prediction Unit Generally, the operations for entropy coding in the "EBCOT" are a large load to the image encoder which compresses an input image by encoding with the JPEG-2000 technique. On the other hand, codes generated by encoding data at a target compression rate or bit rate include some ones that are not actually usable and they will eventually be inutile. However, since it is judged by the rate controller located downstream of the entropy encoder whether the algebraic coding in each encoding pass is necessary, so all the data have to be encoded whether or not the data thus encoded are required in the entropy encoder.

On this account, the to be-encoded object prediction unit 14 provided upstream of the entropy encoder 15 in this embodiment predicts a bit plane most likely to be used eventually, and supplies it as to be-encoded object information D15 to the above-mentioned bit modeling block16. More specifically, the to-be-encoded object prediction unit 14 extracts features on the basis of the quantization coefficient D14 in each bit plane for estimation of the number of codes, and estimates, based on the extracted features, the number of codes to be generated for each bit plane. Then, the to be-encoded object prediction unit 14 predicts, based on the estimated number of codes, a bit plane to be encoded eventually.

Figure 8:
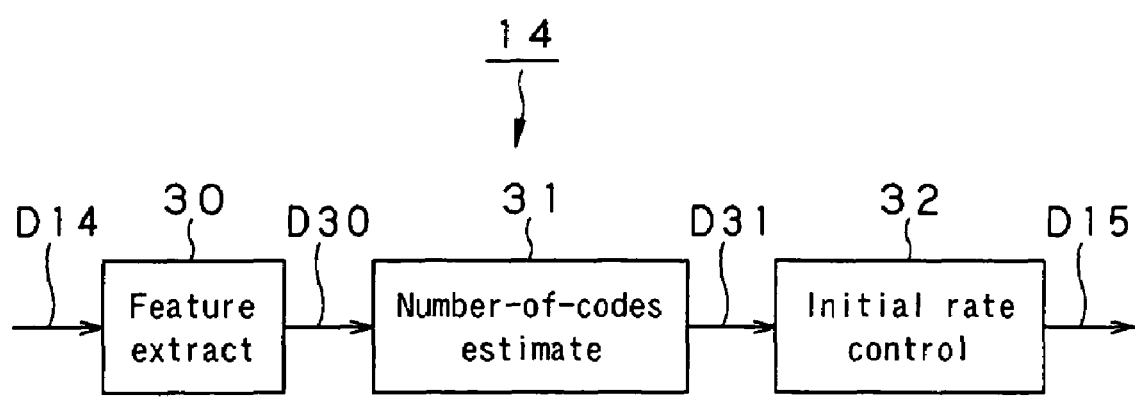
FIG. 8 explains an example of the internal construction of a to-be-encoded object prediction unit of the image encoder.

FIG. 8 explains an example of the internal construction of the to be-encoded object prediction unit 14 of the image encoder 1. As shown in FIG. 8, the to be-encoded object prediction unit 14 is composed of a feature extraction block 30, number-of-codes estimation block 31 and an initial rate controller 32.

On the basis of the quantization coefficient D14 in each bit plane, the feature extraction block 30 predicts the number of quantization coefficients which are newly made significant by the coding of a bit plane to be encoded, that is, the number of quantization coefficients in which the coefficient bit in the object bit plane takes a value "1" and that in a higher one than the object bit plane takes a value "0". The feature extraction block 30 predicts the number of quantization coefficients in each bit plane of all the code blocks, and supplies the number of quantization coefficients as feature amount D30 to the number-of-codes estimation block 31.

The number-of-codes estimation block 31 estimates, based on the feature amount D30 supplied from the feature extraction block 30, the number of codes generated for each bit plane with a technique which will be described in detail later, and supplies the number of codes as an estimated number of codes D31 to the initial rate controller 32.

The initial rate controller 32 sequentially adds the estimated number of codes D31 supplied from the number-of-codes estimation block 31 by a method which will be described later, stops the addition when the estimated number of codes D31 reaches the initial target number of codes, and supplies the bit plane information having been added as to-be-encoded object information D15 to the aforementioned bit modeling block 16.

The operation made in the to-be-encoded object prediction unit 14 will be described in further detail below. It should be noted an ID number is defined for each code block for the convenience of explanation and the to-be-encoded object prediction unit 14 operates in the order of the ID numbers. The ID numbers will be defined in a sequence from a low-frequency band toward a high-frequency band, and in a raster-scanning sequence in the same subband.

Figures 9A, 9B:
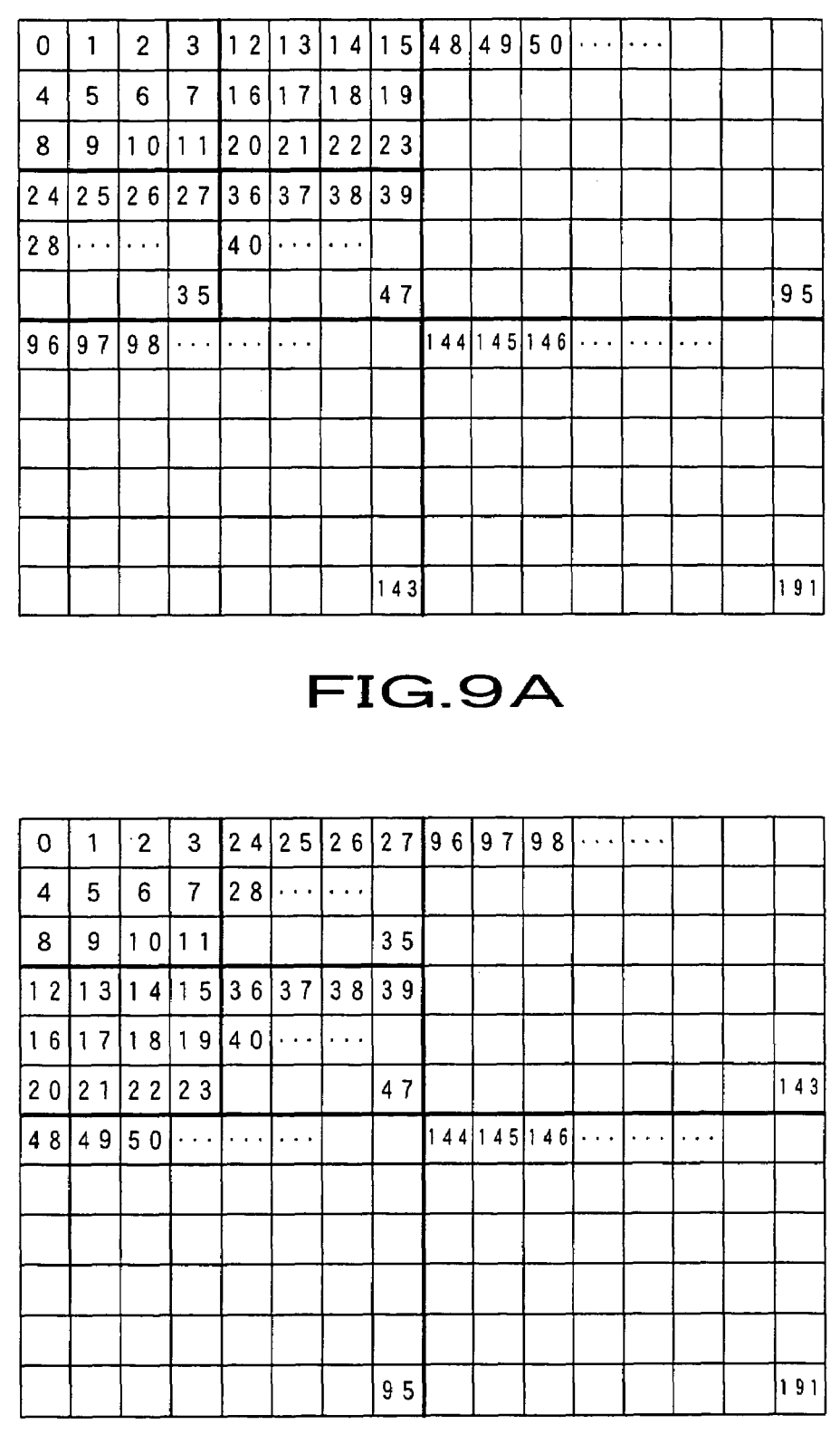

Note that of the HL and LH subbands at the same division level, the HL subband may be given priority over the LH subband as shown in FIG. 9A, or the LH subband may be given priority over the HL subband as shown in FIG. 9B.

Also, in case a plurality of components is included in a color image for example, an ID number is similarly defined for each of all the code blocks. At this time, in case the components include "brightness" and "color difference" components, the brightness component is preferentially ID-numbered.

Also, the code blocks are processed in a direction from the most significant bit (MSB) toward the least significant (LSB). Thus, the number of digits, when a quantization coefficient is binary-notated, will generally be different from one subband to another. On this account, in a code block in which the number of digits is smaller than MAX_BP assumed to be the maximum number of digits in all the subbands, "0" is buried at the MSB side for the number of digits in the code block to be MAX_BP. The bit position counted from the LSB side is thus adjusted.

(2-1-1) Operations of the Feature Extraction Block 30

Figure 10:
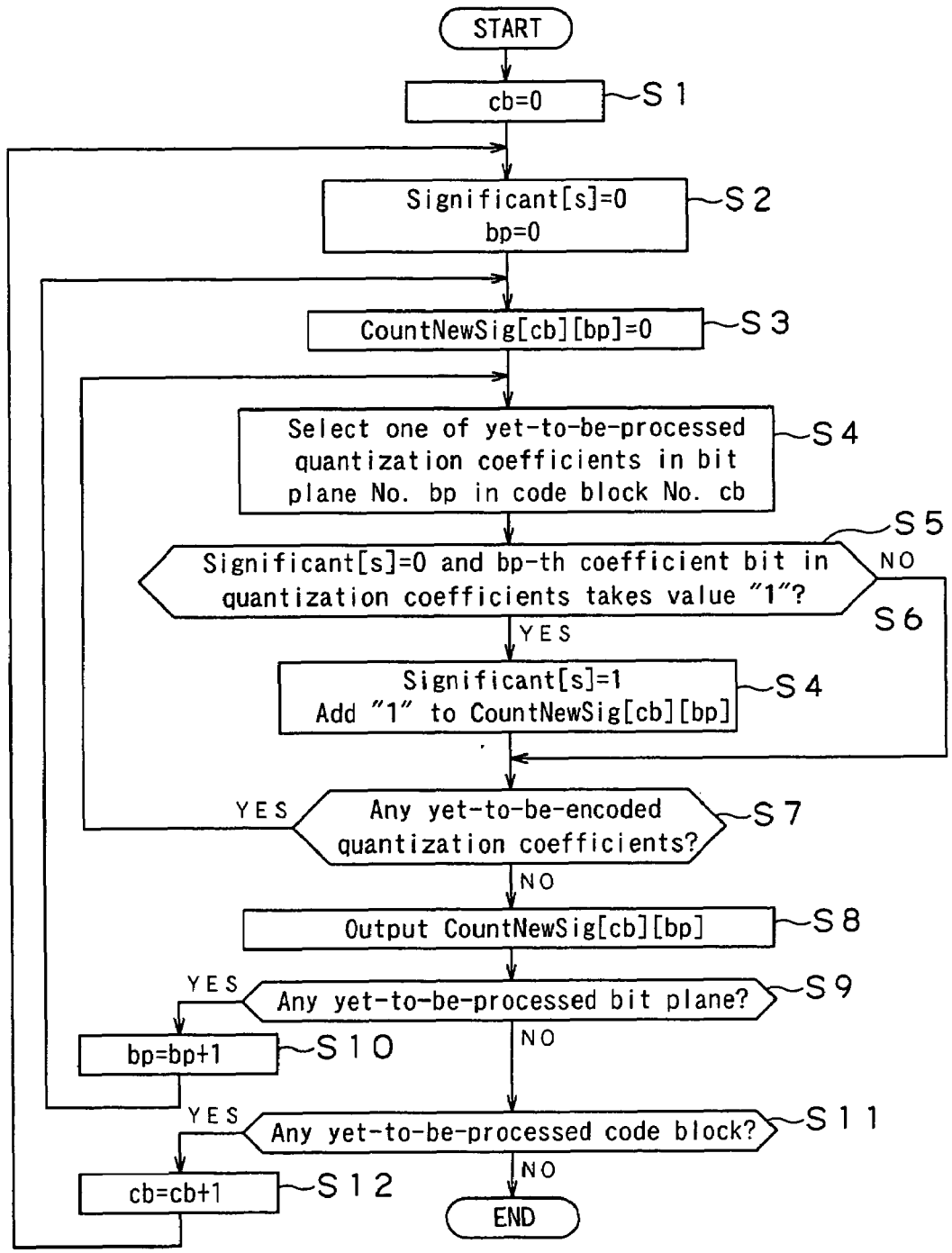
FIG. 10 shows an example flow of operations made for extraction of features in a feature extraction block of the image encoder.

First, an example flow of operations for extraction of features, made in the feature extraction block 30, will be described herebelow with reference to the flow chart in FIG. 10. First in step S1, the feature extraction block 30 initializes the code block No. cb to "0", which means that the number cb for a first code block to be processed is "0".

In next step S2, Significant[s] is initialized to "0" for all the quantization coefficients s in the code block. The Significant[s] is a variable which takes a value "1" when the quantization coefficients s are significant while taking a value "0" when the quantization coefficients s are not significant. Also in step S2, it is further set that bp=0, which means that the number for a first bit plane to be processed is "0". It should be noted that the bit plane numbers bp are numbered "0", "1", "2", ..., MAX_BP-1 starting with the MSB side.

Next in step S3, CountNewSig[cb][bp] is initialized to "0". It should be noted that the "CountNewSig[cb][bp]" is a counter to count quantization coefficients which are newly made significant when a bit plane No. bp in a code block No. cb is encoded.

In step S4, the feature extraction block 30 selects one of the yet-to-be-processed quantization coefficients s in the bit plane No. bp in the code block No. cb, and then judges in step S5 whether the Significant[s] takes a value "0" and the bp-th coefficient bit in the quantization coefficients s takes a value "1". When the result of judgment is affirmative (Yes), that is, when the Significant[s] take a value "0" and the bp-th coefficient bit in the quantization coefficients s takes a value "1", the feature extraction block 30 goes to step S6 where it will change the Significant[s] value to "1" and adds "1" to the CountNewSig[cb][bp]. On the contrary, when the result of judgment is negative (No), the feature extraction block 30 goes to step S7.

In step S7, the feature extraction block 30 judges whether the bit plane No. bp includes any yet-to-be-encoded quantization coefficients s. When the result of judgment is affirmative (Yes), the feature extraction block 30 goes back to step S4. If the result of judgment is negative (No), the feature extraction block 30 goes to step S8 where it will provide a CountNewSig[cb][bp] value. The value is a feature amount D30 in the bit plane No. bp in the code block No. cb and supplied from the feature extraction block 30 to the number-of-codes estimation block 31.

In next step S9, the feature extraction block 30 judges whether the code block No. cb still includes a yet-to-be-processed bit plane. When the result of judgment is affirmative (Yes), the feature extraction block 30 goes to step S10 where it will add '1' to "bp", and goes back to step S3. If the result of judgment is negative (No), the feature extraction block 30 goes to step S11.

In step S11, the feature extraction block 30 judges whether there exists any yet-to-be-processed code block. When the result of judgment is affirmative (Yes), the feature extraction block 30 goes to step S12 where it will add '1' to "cb", and goes back to step S2. If the result of judgment is negative (No), the feature extraction block 30 exits the feature extraction process.

According to the present invention, the feature extraction block 30 makes the above-described operations to count the number of quantization coefficients which are newly made significant in each bit plane in all code blocks, and supplies the count as feature amount D30 to the number-of-codes estimation block 31.

In the above description, the number of quantization coefficients which are newly made significant in a bit plane No. bp in a code block No. cb, that is, the number of quantization coefficients in which coefficient bits in the bit plane No. bp have a value "1" and coefficient bits in an upper bit plane have a value "0" is counted as CountNewSig[cb][bp] and taken as the feature amount D30. However, the present invention is not limited to the above.

For example, CountSig[cb][bp] being the number of quantization coefficients which are significant in a bit plane No. bp in a code block No. cb, that is, the number of quantization coefficients in which coefficient bits in at least one of bit planes above the bit plane No. bp, satisfies the following equations (1) and (2):

$$\begin{cases} CountSig[cb][0] = CountNewSig[cb][0] \\ CountSig[cb][i] = CountSig[cb][i-1] + \\ \qquad CountNewSig[cb][i] \end{cases} (i>0) \quad (1)$$

$$\begin{cases} CountNewSig[cb][0] = CountSig[cb][0] \\ CountNewSig[cb][i] = CountSig[cb][i] - \\ \qquad CountSig[i-1] \end{cases} (i>0) \quad (2)$$

Namely, by determining one of the CountSig[cb][bp] and CountNewSig[cb][bp], the other can be determined. So, the CountSig[cb][bp] can be used as the feature amount D30 in place of the CountNewSig[cb][bp].

Figure 11:
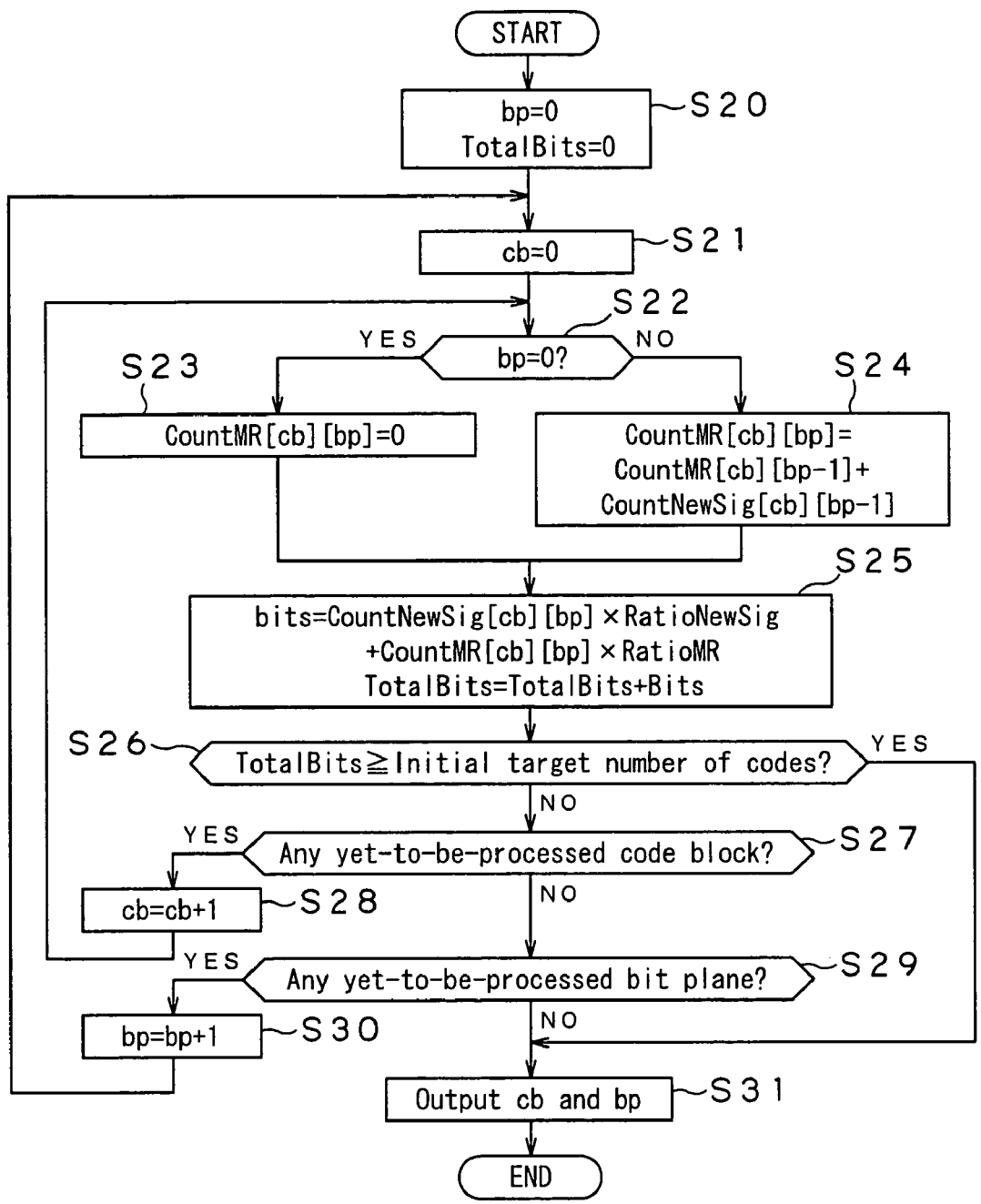
FIG. 11 shows an example flow of operations made in the number-of-codes estimation block and initial rate controller of the image encoder.

(2-1-2) Operations of the Number-of-Codes Estimation Block and Initial Rate Controller Next, an example flow of operations in the number-of-codes estimation block 31 and initial rate controller 32 will be described herebelow with reference to the flow chart in FIG. 11. First in step S20, the number-of-codes estimation block 31 and initial rate controller 32 initialize the number bp for a bit plane in a bit plane to be processed to "0", and a total number of codes TotalBits to "0". In step S21, the number-of-codes estimation block 31 and initial rate controller 32 initialize the number cb for a code block to be processed to "0".

Next in step S22, the number-of-codes estimation block 31 and initial rate controller 32 judge whether the bit plane No. bp is "0". When the result of judgment is affirmative (Yes), the number-of-codes estimation block 31 and initial rate controller 32 go to step S23 where it will set CountMR[cb][bp] to "0". If the result of judgment is negative (No), the number-of-codes estimation block 31 and initial rate controller 32 estimate the CountMR[cb][bp] on the basis of the following equation (3) in step S24. The CountMR[cb][bp] indicates the number of quantization coefficients to be encoded by the MR pass for a bit plane No. bp in a code block No. cb.

$$CountMR[cb][bp] = CountMR[cb][bp-1] + CountNewSig[cb][bp-1] \quad (3)$$

Note that since CountMR[cb][i] is not used after CountMR[cb][i+1] is estimated, it is not necessary to secure any memory area for each of different values bp but the CountMR[cb][i+1] can be stored in the same memory area where the CountMR[cb][i] is stored.

Next in step S25, the number-of-codes estimation block 31 and initial rate controller 32 estimate the number of codes Bits to be generated by encoding a bit plane No. bp in a code block No. cb. on the basis of the following equation (4), and the number of bits Bits thus estimated is added to the total number of codes TotalBits:

$$Bits = CountNewSig[cb][bp] \times RatioNewSig + CountMR[cb][bp] \times RatioMR \quad (4)$$

CountMR[cb][bp]×RatioMR, the second term of the right side of the above equation (4), is an estimated number of codes generated by the MR pass or a bit plane in consideration. The MR pass is to encode coefficient bits which are already significant. That is, since "1" appears in a bit plane above the bit plane in consideration, the coefficient bit takes "0" or "1" in the bit plane with less one-sided probability. Since the number of bits is sufficient to assure that the coefficient bit take "0" or "1" with a probability of ½, the constant RatioMR takes a value of about "1".

Also, CountNewSig[cb][bp]×RatioNewSig, the first term of the right side of the above equation (4), is an estimated number of codes generated by the SP and CU passes for the bit plane. The CountNewSig[cb][bp] indicates the number of quantization coefficients which are not yet significant and in which the coefficient bit in a next bit plane to be encoded is "1". Since this occurs with a low probability, the number of codes generated will be large. On this account, the CountNewSig[cb][bp] is multiplied by a constant RatioNewSig different from the constant RatioMR, the second term in the right-side and the result of multiplication is taken as an estimated number of codes.

Note that since the constant RatioNewSig varies in optimum value depending upon the value of CountMR[cb][bp], a function of the CountMR[cb][bp], for example, may be used to determine the optimum value or an optimum one may be selected among several kinds of values depending upon the value of CountMR[cb][bp]. At this time, an optimum value can be determined for code blocks of difference sizes by normalizing the value of CountMR[cb][bp] by a total of quantization coefficients in a code block.

In step S26, the number-of-codes estimation block 31 and initial rate controller 32 judge whether the total number of codes TotalBits is larger than the initial target number of codes. When the results of judgment is affirmative (Yes), the number-of-codes estimation block 31 and initial rate controller 32 go to step S31 where they will exit the process with outputting a code block No. cb and bit plane No. bp at that time. When the result of judgment is negative (No), namely, if the total number of codes TotalBits is smaller than the initial target number of codes, the number-of-codes estimation block 31 and initial rate controller 32 go to step S27.

In step S27, the number-of-codes estimation block 31 and initial rate controller 32 judge whether there exists any yet-to-be encoded code block. When the result of judgment is affirmative (Yes), the number-of-codes estimation block 31 and initial rate controller 32 go to step S28 where they will add "1" to cb, and go back to step S22. If the result of judgment is negative (No), the number-of-codes estimation block 31 and initial rate controller 32 go to step S29.

In step S29, the number-of-codes estimation block 31 and initial rate controller 32 judge whether there exists a yet-to-be-processed bit plane in the code block No. cb. When the result of judgment is affirmative (Yes), the number-of-codes estimation block 31 and initial rate controller 32 go to step S30 where they will add "1" to bp, and go back to step S21. If the result of judgment is negative (No), the number-of-codes estimation block 31 and initial rate controller 32 go to step S31 where they will exit the process with outputting a code block No. cb and bit plane No. bp at that time.

By making the aforementioned operations, the number-of-codes estimation block 31 and initial rate controller 32 estimate the number of codes D31 in each bit plane on the basis of the feature amount D30 supplied from the feature extraction block 30, add the estimated number of codes D31 sequentially, and stop the addition when the initial target number of codes is reached. Then, they supply the code block No. cb and bit plane No. bp at the stop of the addition as to be-encoded object information D15 to the entropy encoder 15.

In the entropy encoder 15 provided downstream of the number-of-codes estimation block 31 and initial rate controller 32, one of the quantization coefficients D14 in the bit planes, represented by the to be-encoded object information D15, are processed by three encoding passes. That is, for a code block whose number is smaller than cb, bit plane Nos. 0 to bp−1 are encoded, and for a code block whose number is larger than cb, bit plane Nos. 0 to bp are encoded. The remaining bit planes are not encoded.

Since only bit planes represented by the to-be-encoded object information D15 in each code block are actually encoded, so the load of processing is reduced by the omitted number of bit planes, which leads to a reduction of the time for coding.

(2-2) Another Example Flow of Operations Made in the Number-of-Codes Estimation Block and Initial Rate Controller In the above explanation, the number of generated codes is estimated per bit plane and the initial rate is controlled per bit plane. However, the present invention is not limited to this description but the number of generated codes may be estimated per encoding pass and the initial rate be controlled per encoding pass.

Figure 12:
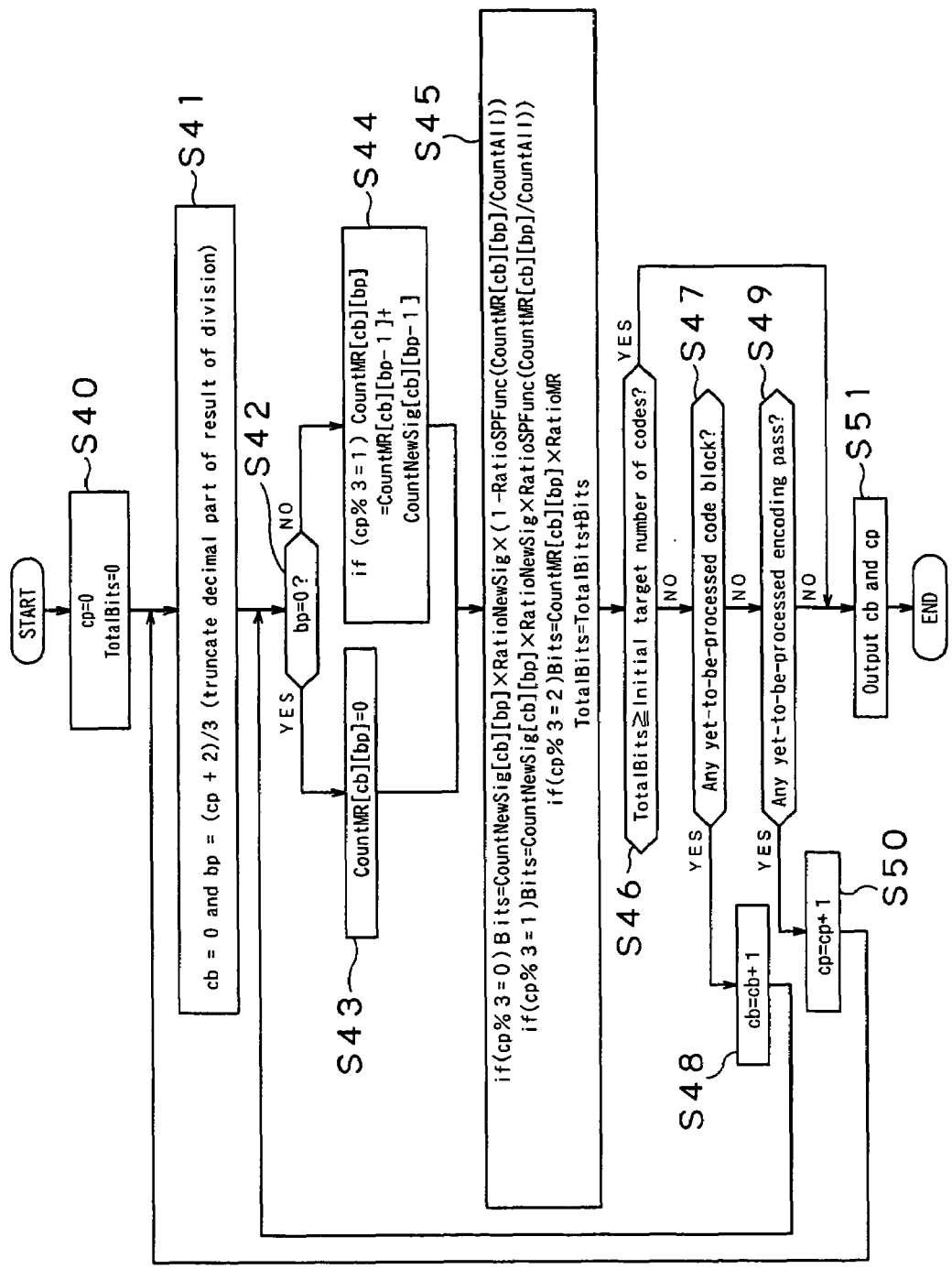
FIG. 12 shows another example flow of operations made in the number-of-codes estimation block and initial rate controller of the image encoder.

FIG. 12 shows an example of flow of operations made in the number-of-codes estimation block 31 and initial rate controller 32 for making initial rate control per encoding pass. First in step S40, the number-of-codes estimation block 31 and initial rate controller 32 initialize the number for an encoding pass cp to "0" and the total number of codes TotalBits to "0". The encoding pass number cp is numbered "0" for a bit plane of bp=0, and then "1", "2", "3", . . . for bit planes of bp=1 and subsequent bit planes, respectively, in the order of SP, MR and CU passes.

In next step S41, the number-of-codes estimation block 31 and initial rate controller 32 initialize the number cb for a code block to be processed to "0" and estimate a current bit plane No. bp on the basis of the following equation (5). It should be noted that the decimal part of the result of division in the equation (5) is truncated.

$$bp=(cp+2)/3 \quad (5)$$

Next in step S42, the number-of-codes estimation block 31 and initial rate controller 32 judge whether the bit plane No. bp is "0". When the result of judgment is affirmative (Yes), the number-of-codes estimation block 31 and initial rate controller 32 go to step S43 where they initialize the CountMR[cb][bp] to "0". On the other hand, when the result of judgment is negative (No) but the remainder of division of the encoding pass No. cp by "3" is "1", that is, when the encoding pass is the first one for each bit plane, the number-of-codes estimation block 31 and initial rate controller 32 go to step S44 where they will estimate the CountMR[cb][bp] on the basis of the following equation (6). The "cp %3" in the equation (6) indicates a remainder of the division of cp by "3".

$$\text{Count}MR[cb][bp]=\text{Count}MR[cb][bp-1]+\text{CountNewSig}[cb][bp-1](cp\%3=1) \quad (6)$$

Next in step S45, the number-of-codes estimation block 31 and initial rate controller 32 estimate the number of codes Bits generated by encoding by an encoding pass defined by a code block No. cb, bit plane No. bp and encoding pass No. cp on the basis of the following equations (7) to (9), and add the number of codes Bits to the total number of codes TotalBits.

$$\text{Bits}=\text{Count}MR[cb][bp]\times\text{Ratio}MR(cp\%3=2) \quad (7)$$

$$\text{Bits}=\text{CountNewSig}[cb][bp]\times\text{RatioNewSig}\times\text{RatioSPFunc}(\text{Count}MR[cb][bp]/\text{CountAll})(cp\%3=1) \quad (8)$$

$$\text{Bits}=\text{CountNewSig}[cb][bp]\times\text{RatioNewSig}\times(1-\text{RatioSPFunc}(\text{Count}MR[cb][bp]/\text{CountAll}))\ (cp\%3=0) \quad (9)$$

More specifically, when the remainder of the division of the encoding pass No. cp by "3" is "2", that is, when the encoding pass is the MR pass, the result of the multiplication of CountMR[cb][bp] by constant RatioMR as given by the equation (7) is the number of codes Bits.

Also, the number of codes generated by the SP and CU passes is CountNewSig[cb][bp]×RatioNewSig as above. When the number of quantization coefficients in a code block is taken as CountAll, the larger the CountMR[cb][bp]/CountAll is, the larger the number of codes generated by the SP pass becomes while the less the number of codes generated by the CU pass becomes. It means that when the CountMR[cb][bp]/CountAll is larger, there are many significant coefficient bits. Namely, the requirement for encoding by the SP pass that there exists at least one significant coefficient bit near "8" is easily satisfied.

On this account, when the remainder of division of an encoding pass No. cp by "3" is "1", namely, when the encoding pass is the SP pass, a result of the multiplication of CountNewSign[cb][bp]×RatioNewSig by RatioSPFunk (CountMR[cb][bp]/CountAll), a function of converting CountMR[cb][bp]/CountAll into the number of codes by the SP pass, as given by the equation (8), is taken as the number of codes Bits.

On the other hand, when the remainder of division of an encoding pass No. cp by "3" is "0", namely, when the encoding pass is the CU pass, a result of the multiplication of CountNewSig[cb][bp]×RatioNewSig by 1-RatioSPFunk (CountMR[cb][bp]/CountAll) as given by the equation (9) is taken as the number of codes Bits.

In step S46, the number-of-codes estimation block 31 and initial rate controller 32 judge whether the total number of codes TotalBits is larger than the initial target number of codes. When the result of judgment is affirmative (Yes), the number-of-codes estimation block 31 and initial rate controller 32 go to step S51 where they exit the process with outputting a code block No. cb and encoding pass No. cp at that time. On the other hand, when the result of judgment is negative (No), namely, when the total number of codes TotalBits is smaller than the initial target number of codes, the number-of-codes estimation block 31 and initial rate controller 32 go to step S47.

In step S47, the number-of-codes estimation block 31 and initial rate controller 32 judge whether there exists any yet-to-be-processed code block. When the result of judgment is affirmative (Yes), the number-of-codes estimation block 31 and initial rate controller 32 go to step S48 where they will add "1" to cb, and go back to step S42. When the result of judgment is negative (No), the number-of-codes estimation block 31 and initial rate controller 32 go to step S49.

In step S49, the number-of-codes estimation block 31 and initial rate controller 32 judge whether there exists any yet-to-be-processed encoding pass in the code block No. cb. When the result of judgment is affirmative (Yes), the number-of-codes estimation block 31 and initial rate controller 32 go to step S50 where they will add "1" to cp, and go back to step S41. If the result of judgment is negative (No), the number-of-codes estimation block 31 and initial rate controller 32 go to step S51 where they will exit the process with outputting a code block No. cb and encoding pass No. cp at that time.

With the above operations, the number-of-codes estimation block 31 and initial rate controller 32 estimate the number of codes for each encoding pass on the basis of the feature amount D30 supplied from the feature extraction block 30, add the estimated number of codes sequentially in the aforementioned order, and stop the addition when the initial target number of codes is reached. Then, they supply the code block No. cb and encoding pass No. cp at the stop of the addition as the to be-encoded object information D15 to the entropy encoder 15.

In the entropy encoder 15 provided downstream of the number-of-codes estimation block 31 and initial rate controller 32, one of the quantization coefficients D14 in the bit planes, represented by the to-be-encoded object information D15, are processed by three encoding passes. That is, for a code block whose number is smaller than cb, encoding pass Nos. 0 to cp−1 are encoded, and for a code block whose number is larger than cb, bit plane Nos. 0 to cp are encoded. The remaining bit planes are not encoded.

Since only encoding passes represented by the to be-encoded object information D15 for each code block are actually encoded, the load of processing is reduced by the omitted number of bit planes, which leads to a reduction of the time for coding.

(2-3) Operations of the Rate Controller

The initial rate controller 32 and rate controller 18 control the rate in the same manner. Therefore, in case the number of codes generated in the number-of-codes estimation block 31 can perfectly be estimated, the code stream generator 19 can generate a code stream D19 using all encoding passes encoded by the entropy encoder 15 without the use of the rate controller 18.

Generally, the number-of-codes estimation block 31 cannot of course perfectly estimate the number of codes. Since the rate can be controlled to a size approximate to the target number of codes, however, the rate controller 18 can be omitted in case the deviation in size from the target number of codes falls within an allowable range for the purpose of the image encoder 1.

However, in case the number-of-codes estimation block 31 has overestimated the number of codes generated for each bit plane, the number of encoding passes necessary for arrival at the target number of codes will be smaller than the actual one and thus will not possibly reach the target number of codes even if all the encoding passes encoded by the entropy encoder 15 are included in the code stream D19. In this case, the quality of an image obtainable by decoding will be low as compared with that of an image obtainable by decoding the stream of codes having encoding passes additionally included for attaining the target number of codes.

On this account, in case the number of codes generated for each bit plane may possibly be estimated to be larger than the actual one or in case a high image quality is demanded, the initial target number of codes may be increased or a small number of codes within a range of estimation may be used as an estimated number of codes.

Figure 13:
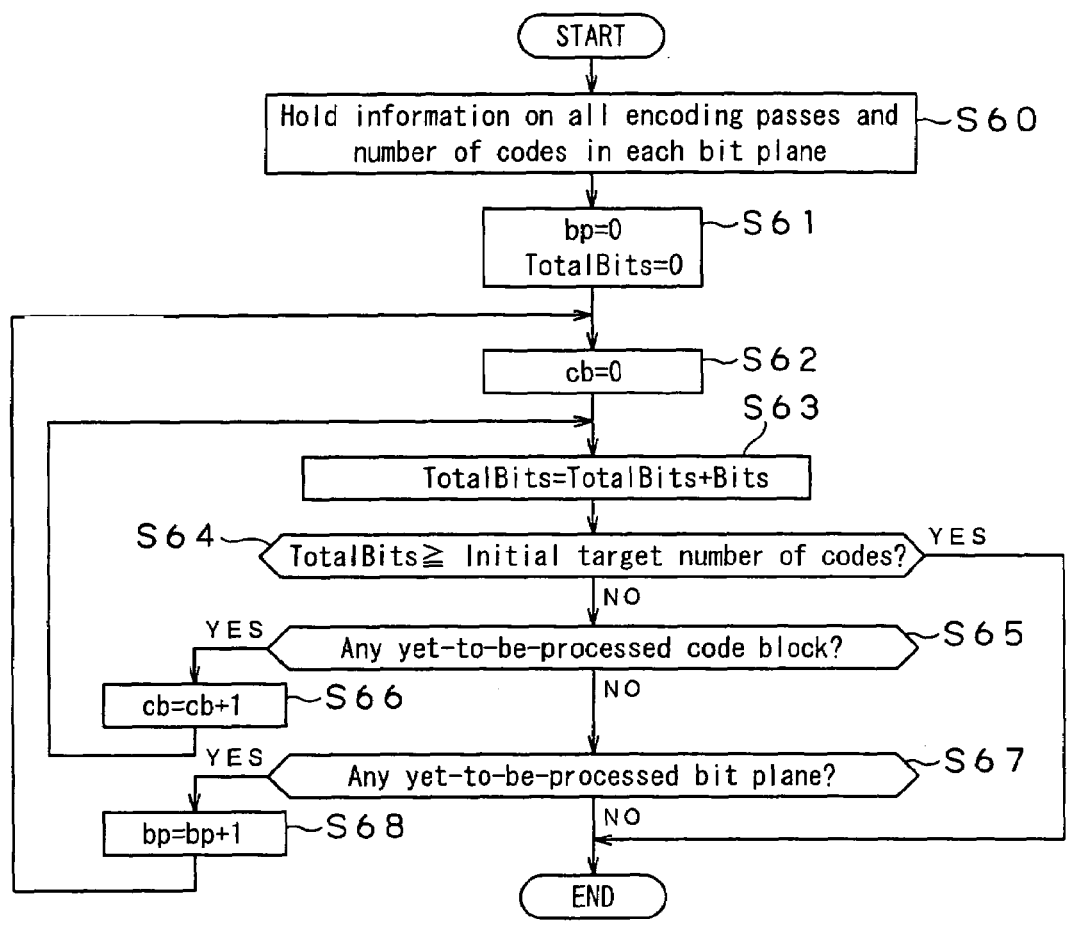
FIG. 13 shows an example flow of operations made in the rate controller of the image encoder.

In this case, the rate control should preferably be done by the rate controller 18 as will be described below with reference to the flow chart in FIG. 13. First in step S60, the rate controller 18 holds information on all the encoding passes encoded by the entropy encoder 15 and number of codes in each bit plane.

Next in step S61, the rate controller 18 initializes the number bp for a bit plane to be encoded to "0" and total number of codes TotalBits to "0", respectively. In step S62, the rate controller initializes the number cb for a code block to be processed to "0".

Next in step S63, the rate controller 18 adds the number of codes Bits in the bit plane No. bp in the code block No. cb to the total number of codes TotalBits.

In step S64, the rate controller 18 judges whether the total number of codes TotalBits is larger than the target number of codes. When the result of judgment is affirmative (Yes), the rate controller 18 ceases the addition of codes. On the contrary, if the result of judgment is negative (No), the rate controller 18 will go to step S65.

In step S65, the rate controller 18 judges whether there exists a yet-to-be-processed code block. When the result of judgment is affirmative (Yes), the rate controller 18 goes to step S66 where it will add "1" to cb, and goes back to step S63. If the result of judgment is negative (No), the rate controller 18 goes to step S67.

In step S67, the rate controller 18 judges whether there exists a yet-to-be-processed bit plate in the code block No. cb. When the result of judgment is affirmative (Yes), the rate controller 18 goes to step S68 where it will add "1" to bp, and goes back to step S62. If the result of judgment is negative (No), the rate controller 18 ceases the addition of number of codes.

As above, the rate controller 18 adds the number of codes in the order of code block numbers cb starting with the bit plane No. bp=0 where the bit position is highest, shifts to a lower bit position when having added all the numbers of codes in the same bit positions, and repeats the similar addition in the order of code block numbers cb until a target number of codes is reached. Thus, the number of bit planes to be truncated without eventually being selected is different by a maximum of one bit plane, when counted from the LSB, from the number of bit planes in all the code blocks in one frame, and so there is no difference in image quality between the subbands. That is, the present invention assure a totally high image quality.

(3) Others

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

For example, the initial rate controller 32 may provide an initial rate control using the RD (rate-distortion) characteristic. In the initial rate control using the RD characteristic, an estimated number of codes generated for each bit plane and a distortion to be reduced when the bit plane is involved are compared with each other, and a bit plane whose distortion reduction per estimated number of codes is largest is preferentially encoded. In this case, the rate controller 18 provided downstream of the initial rate controller 32 should preferably provide a rate control based on the RD characteristic.

The present invention is not limited to the embodiment thereof having been described as a hardware construction. An arbitrary process can be implemented by allowing a CPU (central processing unit) to execute a computer program. In this case, the computer program can be provided to the users as a record to a recording medium, and also it can be distributed by transmission over the Internet or any similar transmission medium.

In the aforementioned image encoding apparatus and method according to the present invention, an input image is filtered to generate subbands, the subbands thus filtered are divided into code blocks of a predetermined size, and a bit plane ranging from the most significant bit (MSB) to least significant bit (LSB) is generated for each of the code blocks. Then, the number of codes in each bit plane is estimated, a bit plane to be encoded is predicted based on the estimated number of codes, each of the to be-encoded bit planes is subjected to bit modeling to generate an encoding pass for each bit plane, algebraic coding is done within the encoding pass, and a stream of codes is generated using the algebraic code thus generated.

Also, in the image encoding apparatus and method according to the present invention, an input image is filtered to generate subbands, the subbands thus filtered are divided into code blocks of a predetermined size, and a bit plane ranging from the most significant bit (MSB) to least significant bit (LSB) is generated for each of the code blocks. Also, the number of codes in each encoding pass is estimated, and a pass to be encoded is predicted based on the estimated number of codes. Then each of the bit planes is subjected to bit modeling to generate an encoding pass for each bit plane, data within one to be encoded of the encoding passes is algebraically encoded, and a stream of codes is generated using the algebraic code thus generated.

With the aforementioned image encoding method and apparatus according to the present invention, the number of codes in each bit plane or encoding pass is estimated before the algebraic coding, and a bit plane or encoding pass to be encoded is predicted based on the estimated number of codes, and only the bit plane or encoding pass to be encoded is algebraically encoded. Thus, it is possible to reduce the load of algebraic coding.

Also, the aforementioned program allows a computer to execute the above-mentioned image encoding, and the aforementioned recording medium according to the present invention has the program recorded therein and is computer-readable.

With the program and recording medium, it is possible to implement the aforementioned image coding by software.

What is claimed is:

1. An image encoder comprising:
a filtering means for filtering an input image to generate subbands;
a bit plane generating means for dividing each of the subbands into code blocks of predetermined sizes to generate a corresponding bit plane ranging from the most significant bit (MSB) to least significant bit (LSB) in each of the code blocks;
a number-of-codes estimating means for estimating the number of codes in each corresponding bit plane;
a to-be-encoded object predicting means for predicting a to-be-encoded bit plane on the basis of the estimated number of codes of each of the code blocks;
a bit modeling means for making bit modeling of each of the to-be-encoded bit planes of each of the code blocks;
an encoding pass generating means for generating an encoding pass for each of the to-be-encoded bit planes of each of the code blocks;
an algebraic coding means for making algebraic coding within the encoding pass generated by the encoding pass generating means; and
a code stream generating means for generating a stream of codes using the algebraic code generated by the algebraic coding means.

2. The image encoder as set forth in claim 1, wherein the number-of-codes estimating means counts coefficients included in each bit plane and whose value is not "0" in the bit plane and is "0" in a bit plane above that bit plane to determine a first count, and estimates the number of codes on the basis of the first count.

3. The image encoder as set forth in claim 2, wherein the number-of-codes estimating means counts coefficients included in each bit plane and whose value is not "0" in at least one bit plane above that bit plane to determine a second count, and adds a value resulted from multiplication of the first count by a first constant and a result of multiplication of the second count by a second constant to estimate the number of codes.

4. The image encoder as set forth in claim 3, wherein the number-of-codes estimating means normalizes the second count by a total number of coefficients in the code block for use.

5. The image encoder as set forth in claim 1, wherein the number-of-codes estimating means counts coefficients included in the bit plane or in at least one bit plane above that bit plane and whose value is not "0" and estimate the number of codes.

6. The image encoder as set forth in claim 1, wherein the to-be-encoded object predicting means adds the estimated number of codes in the order from a bit plane of MSB to a bit plane of LSB in all code blocks of the input image, stops the addition when a predetermined target number of codes is exceeded, and takes the bit planes whose estimated number of codes have been added together as the to-be-encoded bit planes.

7. The image encoder as set forth in claim 6, wherein the to-be-encoded object predicting means adds the estimated number of codes in the order from the highest-frequency subband to lowest-frequency subband for the bit planes in the same bit positions.

8. The image encoder as set forth in claim 6, wherein the to-be-encoded object predicting means adds the estimated number of codes in the order from the brightness information component to color-difference information component for the bit planes in the same bit positions.

9. The image encoder as set forth in claim 1, wherein the to-be-encoded object predicting means calculates a reduction of distortion to be attained by encoding each bit plane, adds the estimated number of codes in the order from a bit plane for which the reduced amount of distortion per estimated number of codes is larger to a bit plane for which the reduced amount of distortion per estimated number of codes is smaller, stops the addition when a predetermined target number of codes is exceeded, and takes the bit planes whose estimated number of codes have been added together as the to-be-encoded bit planes.

10. An image encoder comprising:
a filtering means for filtering an input image to generate subbands;
a bit plane generating means for dividing each of the subbands into code blocks of predetermined sizes to generate a corresponding bit plane ranging from the most significant bit (MSB) to least significant bit (LSB) in each of the code blocks;
a number-of-codes estimating means for estimating the number of codes in each encoding pass of a plurality of encoding passes used to generate the corresponding bit plane;
a to-be-encoded object predicting means for predicting a to-be-encoded encoding pass on the basis of the estimated number of codes in each encoding pass of the plurality of encoding passes;
a bit modeling means for making bit modeling of each of the to-be-encoded bit plane of each of the code blocks;
an encoding pass generating means for generating an encoding pass for each of the to-be-encoded bit planes of each of the code blocks;
an algebraic coding means for making algebraic coding of the to-be-encoded encoding passes generated by the encoding pass generating means; and
a code stream generating means for generating a stream of codes using the algebraic code generated by the algebraic coding means.

11. An image encoding method comprising the steps of:
filtering an input image to generate subbands;
dividing each of the subbands into code blocks of predetermined sizes to generate a corresponding bit plane ranging from the most significant bit (MSB) to least significant bit (LSB) in each of the code blocks;
estimating the number of codes in each corresponding bit plane;
predicting a to-be-encoded bit plane on the basis of the estimated number of codes of each of the code blocks;
making bit modeling of each of the to-be-encoded bit planes of each of the code blocks;
generating an encoding pass for each of the to-be-encoded bit planes of each of the code blocks;
making algebraic coding within the encoding pass generated by the encoding pass generating step; and
generating a stream of codes using the algebraic code generated by the algebraic coding step.

12. An image encoding method comprising the steps of:
filtering an input image to generate subbands;
dividing each of the subbands into code blocks of predetermined sizes to generate a corresponding bit plane ranging from the most significant bit (MSB) to least significant bit (LSB) in each of the code blocks;
estimating the number of codes in each encoding pass of a plurality of encoding passes used to generate the corresponding bit plane;
predicting a to-be-encoded encoding pass on the basis of the estimated number of codes in each encoding pass of the plurality of encoding passes;
making bit modeling of each of the to-be-encoded bit plane of each of the code blocks;
generating an encoding pass for each of the to-be-encoded bit planes of each of the code blocks;
making algebraic coding of the to-be-encoded encoding passes generated by the encoding pass generating step; and
generating a stream of codes using the algebraic code generated by the algebraic coding step.

13. A computer-readable recording medium having recorded therein a program allowing a computer to execute a predetermined process, the program comprising the steps of:
filtering an input image to generate subbands;
dividing each of the subbands into code blocks of predetermined sizes to generate a corresponding bit plane ranging from the most significant bit (MSB) to least significant bit (LSB) in each of the code blocks;
estimating the number of codes in each corresponding bit plane;
predicting a to-be-encoded bit plane on the basis of the estimated number of codes of each of the code blocks;
making bit modeling of each of the to-be-encoded bit planes of each of the code blocks;
generating an encoding pass for each of the to-be-encoded bit planes of each of the code blocks;
making algebraic coding within the encoding pass generated by the encoding pass generating step; and
generating a stream of codes using the algebraic code generated by the algebraic coding step.

14. A computer-readable recording medium having recorded therein a program allowing a computer to execute a predetermined process, the program comprising the steps of:
filtering an input image to generate subbands;
dividing each of the subbands into code blocks of predetermined sizes to generate a corresponding bit plane ranging from the most significant bit (MSB) to least significant bit (LSB) in each of the code blocks;
estimating the number of codes in each encoding pass of a plurality of encoding passes used to generate the corresponding bit plane;
predicting a to-be-encoded encoding pass on the basis of the estimated number of codes in each encoding pass of the plurality of encoding passes;
making bit modeling of each of the to-be-encoded bit plane of each of the code blocks;
generating an encoding pass for each of the to-be-encoded bit planes;
making algebraic coding of the to-be-encoded encoding passes generated by the encoding pass generating step; and
generating a stream of codes using the algebraic code generated by the algebraic coding step.

* * * * *